C. CHAMBERS, Jr.
DOUGH MIXING MACHINE.
APPLICATION FILED AUG. 16, 1906.
921,361.
Patented May 11, 1909.
6 SHEETS—SHEET 1.
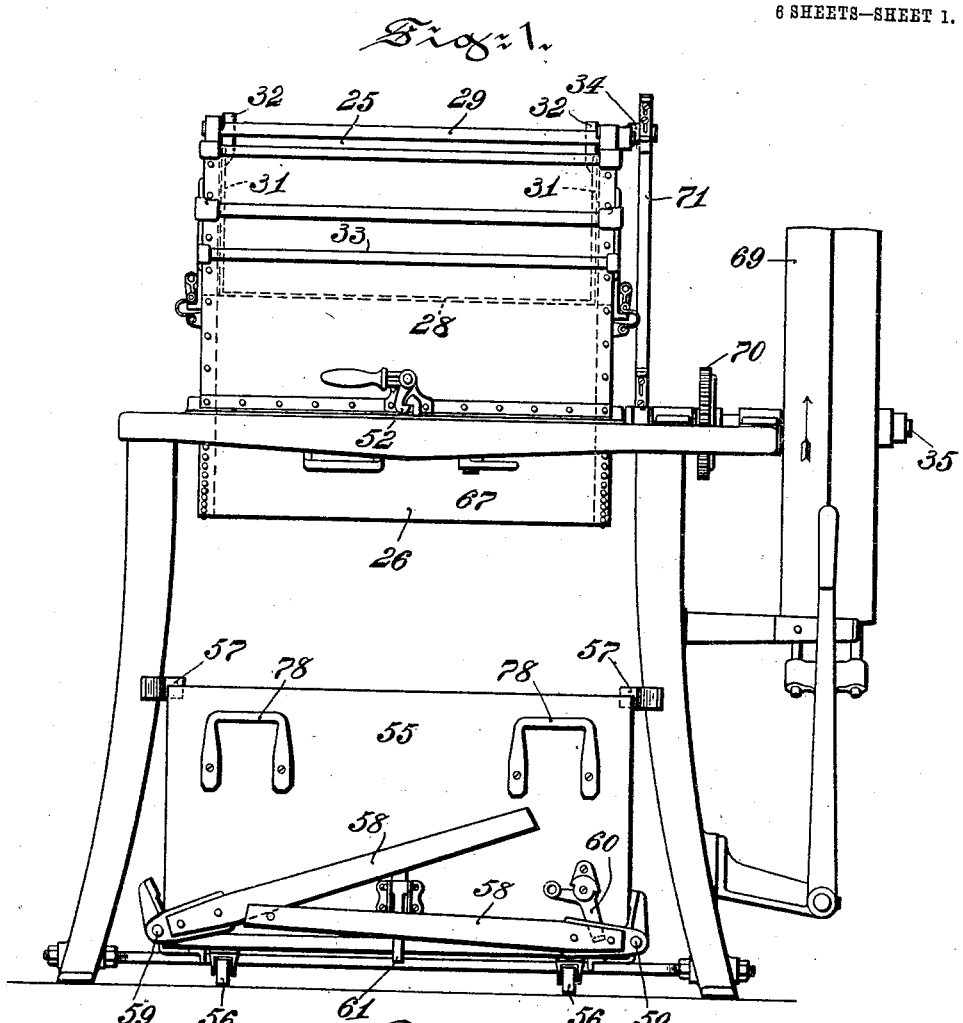
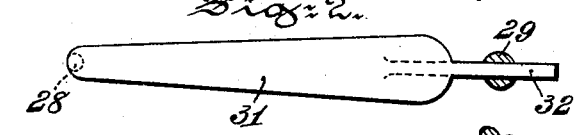
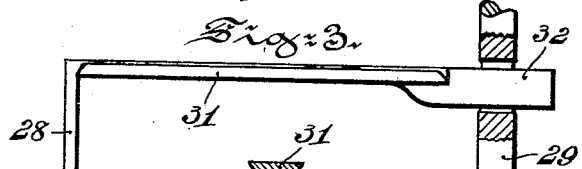
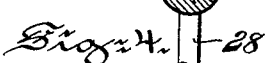
WITNESSES:
Mae Hofmann
Jas. C. Wohnsmith
INVENTOR
Cyrus Chambers, Jr.
BY
Thos. Wordale
ATTORNEY.

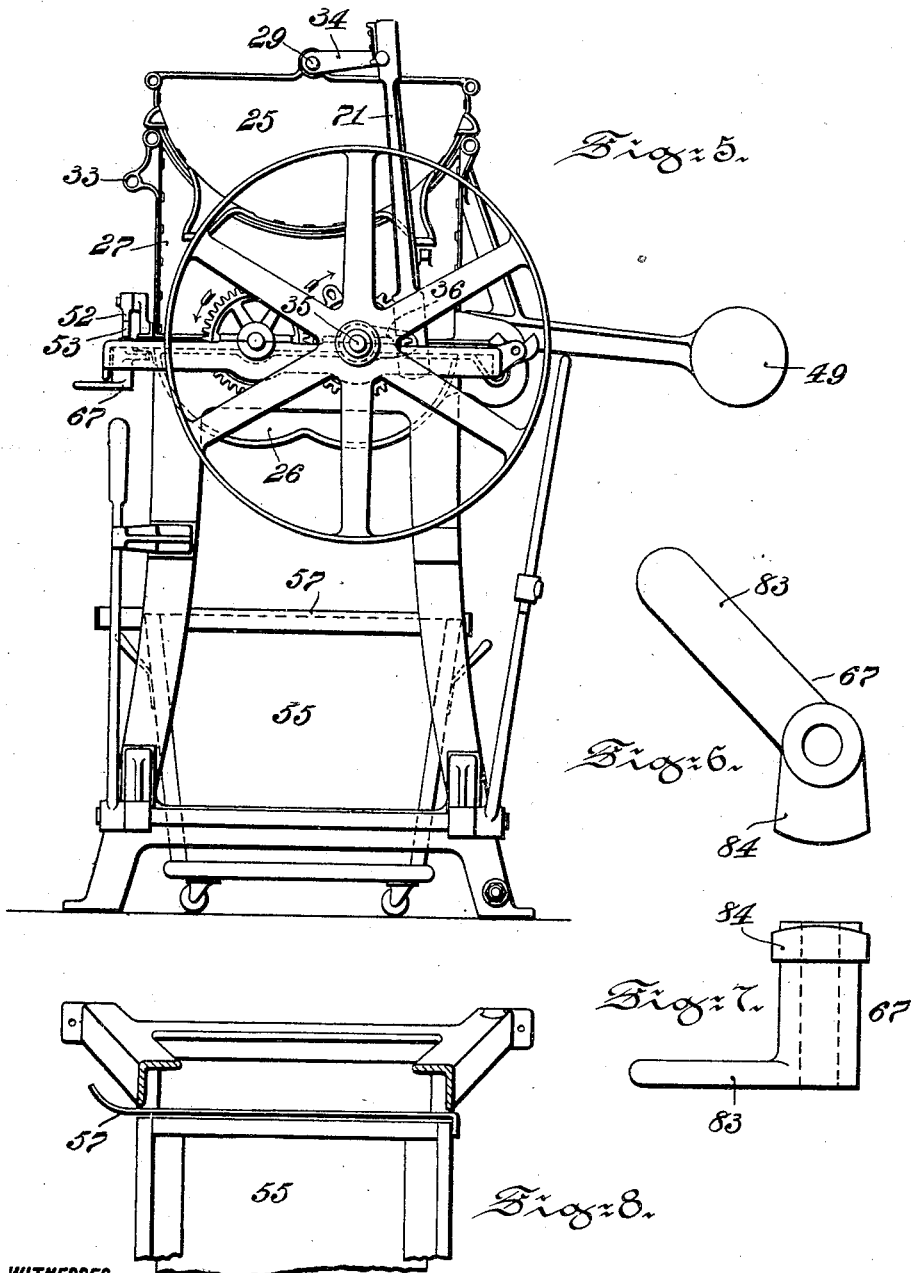

C. CHAMBERS, Jr.
DOUGH MIXING MACHINE.
APPLICATION FILED AUG. 16, 1906.
921,361.
Patented May 11, 1909.
6 SHEETS—SHEET 3.
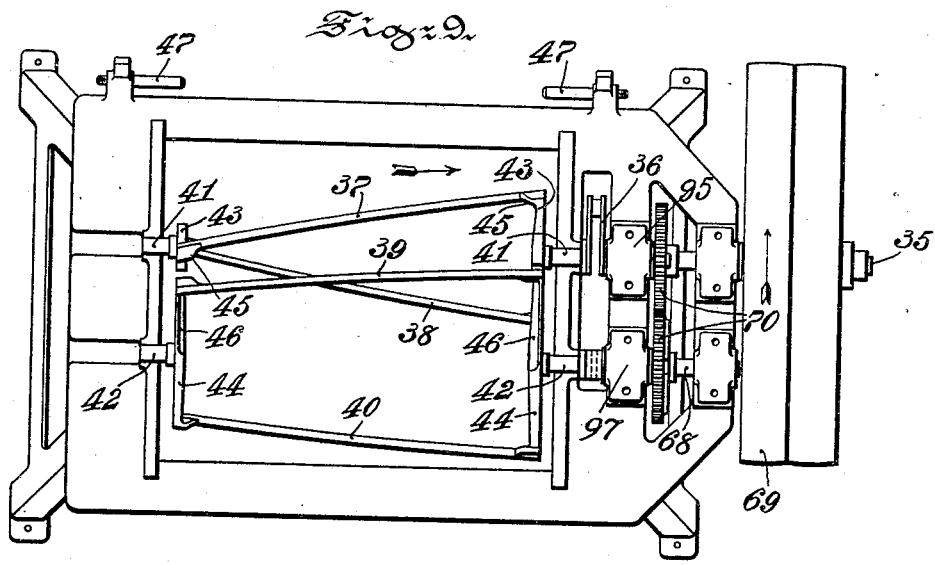
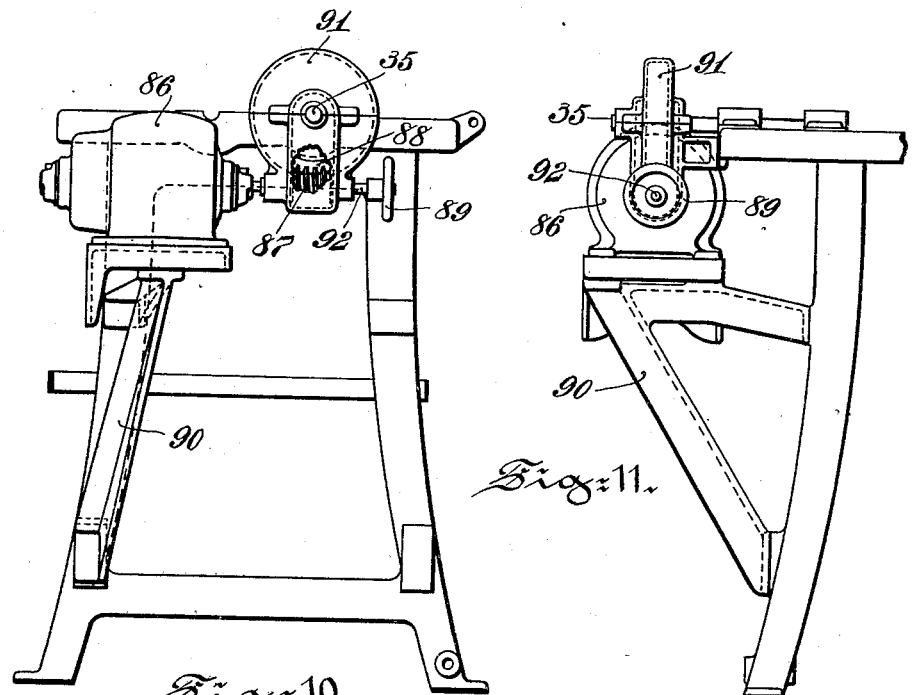
WITNESSES:
Mae Hofmann
Jas. C. Hobensmith
INVENTOR
Cyrus Chambers, Jr.,
BY
Thos. Evans dal
ATTORNEY.

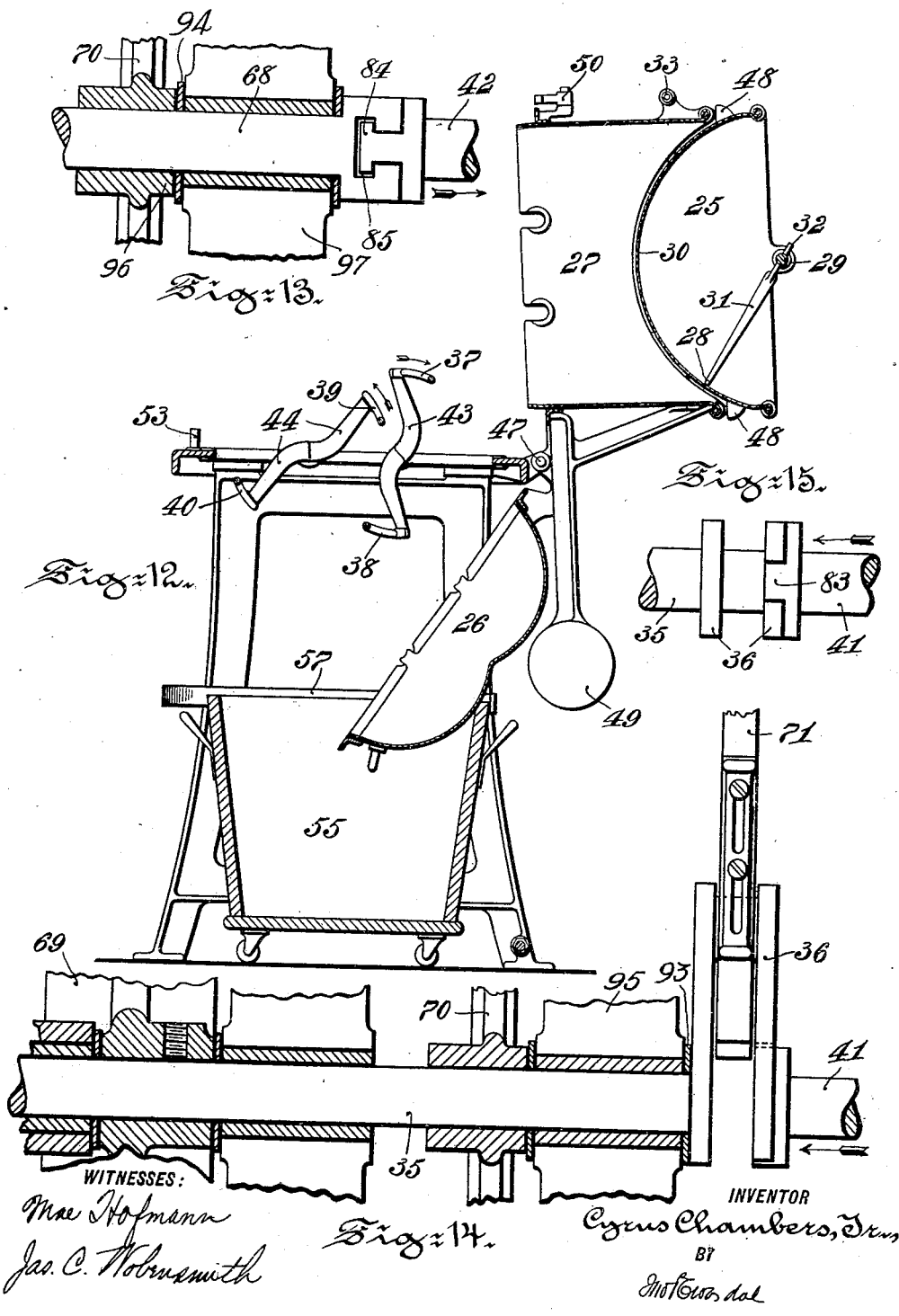

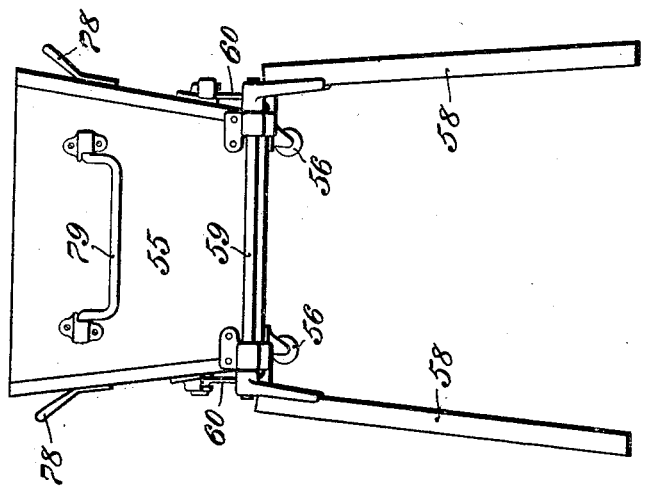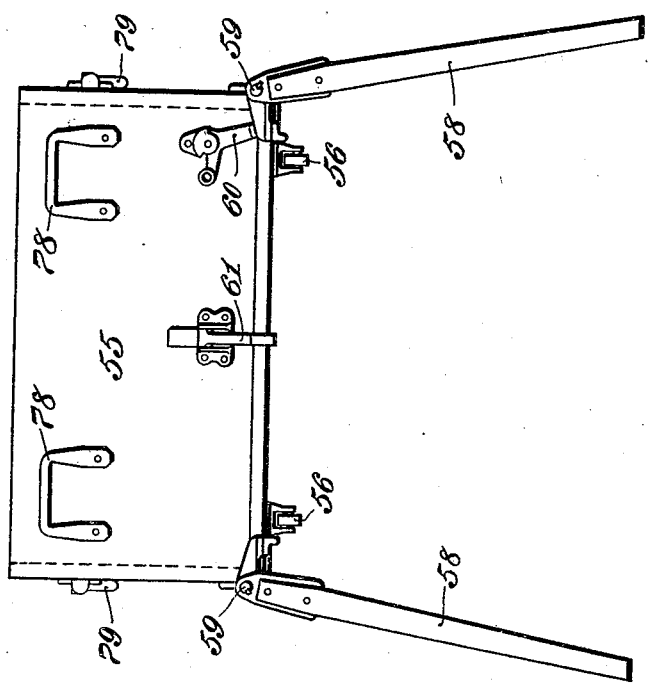

C. CHAMBERS, Jr.
DOUGH MIXING MACHINE.
APPLICATION FILED AUG. 16, 1906.
921,361.
Patented May 11, 1909.
6 SHEETS—SHEET 6.
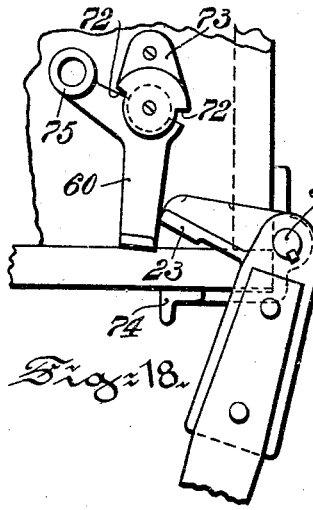
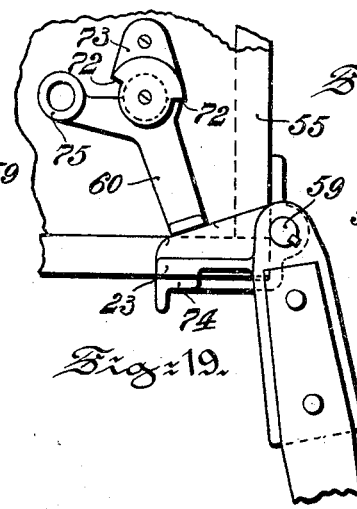
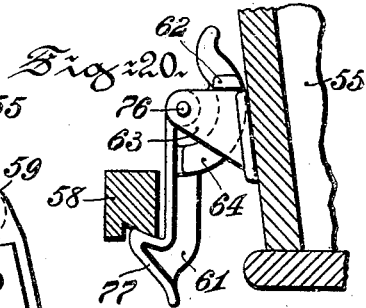
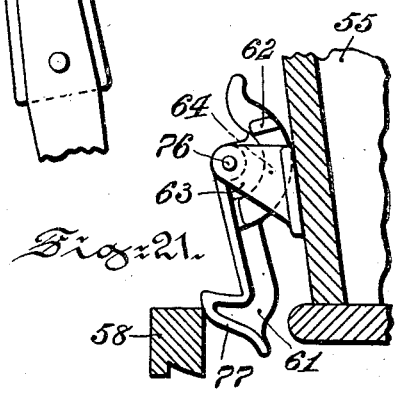
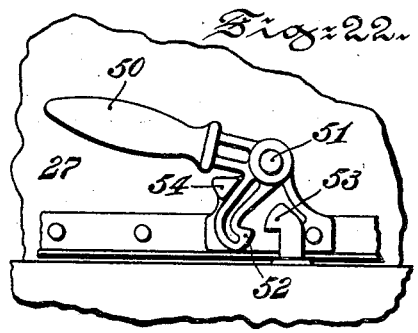
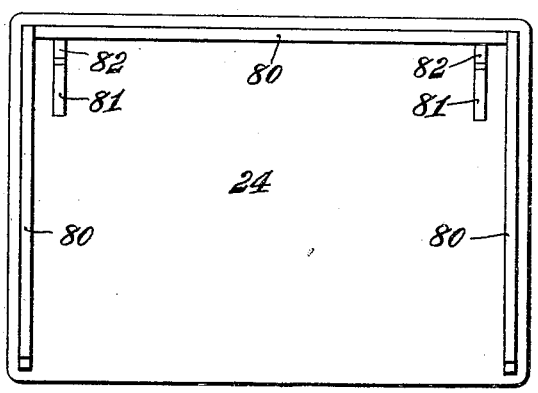
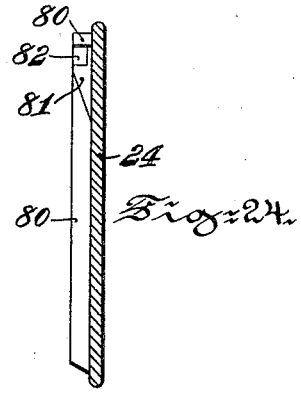
WITNESSES:
Mae Hofmann
Jas. C. Nobmsmith
INVENTOR
Cyrus Chambers, Jr.,
BY
Jno. Crosdale
ATTORNEY.

UNITED STATES PATENT OFFICE.

CYRUS CHAMBERS, JR., OF OVERBROOK, PENNSYLVANIA.

DOUGH-MIXING MACHINE.

No. 921,361.  Specification of Letters Patent.  Patented May 11, 1909.

Application filed August 16, 1906. Serial No. 330,802.

*To all whom it may concern:*

Be it known that I, CYRUS CHAMBERS, Jr., a citizen of the United States, residing at Overbrook, in the county of Montgomery and State of Pennsylvania, have invented a new and useful Dough-Mixing Machine, of which the following is a specification.

My invention relates to improvements in dough mixing machines.

The object of my invention is to provide improved means for mixing the flour and liquid in such manner as to complete the mixing before the gluten contained in the flour is developed or saturated by the moisture, so that each particle of flour may be dropped into comparative liquid and thus be surrounded by moisture before it becomes glutenous or viscous, whereby a thorough saturation of each starch granule is insured, and the whole operation completed before the mixture becomes tenacious, or doughy, or unfluidlike.

My invention is especially adapted for mixing dough in large quantities.

My invention comprises means for sifting into a mixing basin provided with an efficient mixing mechanism, the flour rapidly at the commencement of the operation, while the liquid is thin or fluidlike, and gradually lessening the amount of flour sifted as the liquid thickens up by the previously sifted flour, the whole operation being completed within the space of one minute or within a space of time insufficient for development of gluten My invention also comprises means whereby a thorough mixing of the flour and liquid is performed with a device which is cheaply constructed, efficient in operation and easily cleaned.

My invention also comprises improved means for securing and supporting the air chamber and sifter so that ready access to the mixing blades is obtained.

My invention also comprises convenient means for receiving the dough from the mixing chamber and for containing the dough during further manipulation or development until put into the pans.

My invention also contains improvements in details of construction.

Referring to the drawings:—Figure 1 is a front elevation of my device. Fig. 2 is an end elevation of the sifting yoke. Fig. 3 is a fragmentary side view of same. Fig. 4 is a section on line 4, 4 of Fig. 3. Fig. 5 is an end elevation of my device. Fig. 6 is a plan view of a catch member. Fig. 7 is a side elevation of same. Fig. 8 is a plan view of an end of the dough tray with the adjoining framework in section. Fig. 9 is a plan view with the sifter, air chamber and basin removed. Fig. 10 is an end elevation showing electric motor means of operation substituted for the pulleys. Fig. 11 is a transverse view of the motor mechanism. Fig. 12 is a vertical cross section of the machine with the sifter and air chamber elevated and the mixing basin lowered into the dough tray, viewed from the driven end of the machine. Fig. 13 is a horizontal section of the driving shaft bearing, showing the coöperating coupling ends of the driving shaft and mixing shaft. Fig. 14 is a plan view of a portion of the main driving shaft, showing the double crank and coupling end of mixing shaft with the bearings in section. Fig. 15 is a plan view of the coupling ends of the other mixing and driving shafts. Fig. 16 is a front view of the dough tray with the legs open. Fig. 17 is an end view of same. Fig. 18 is a fragmentary view in elevation of a corner of the dough tray showing the leg socket in the position where it encounters the gravity latch for holding the leg open. Fig. 19 is a similar view showing the leg socket held in the open position. Fig. 20 is a side elevation of the gravity catch holding the leg in closed position, the leg and adjoining trough structure being in section. Fig. 21 is a similar view showing the leg just encountering the latch when being forced in the closed position. Fig. 22 is a front elevation of the gravity latch for securing the air chamber in place when closed. Fig. 23 is an underside view of the cover for the dough tray. Fig. 24 is a section on line 24, 24 of Fig. 23.

Similar numerals refer to similar parts throughout the several views.

As shown in end elevation in Fig. 5, the sifter hopper 25 is of larger dimension than the mixing basin 26. The sifter hopper 25 rests upon the air chamber 27 which is provided with vertically extending side and end walls. From an inspection of Fig. 12, it will be noted that the sifter bar 28 will have a maximum stroke with respect to the sifting hopper, that is from approximately the top at one side to approximate the top at the other side. The shaft 29 of said bar 28 is located above the top edges of the hopper; the construction being such that the flour required for one batch will all be held below the rock shaft 29 so that there is no flour above the journals thereof and consequently no leakage through said journals. The sifter bar 28 moves around the surface of the perforated metal 30 of the sifting hopper through an arc say of one-hundred and forty-five degrees. The air chamber has a sufficient dimension at its top to receive the siftings from said perforated bottom and conduct the same to the mixing basin 26 throughout the whole surface thereof. The sifter bar 28 has a horizontal extension provided with the two side arms 31 extending at right angles therewith and radially with respect to its axis of rotation. These radial arms 31 are half oval in form as shown in detail in Fig. 4, with the flat side working toward the end of the sifter, for the purpose of cutting through the flour and pushing it away from the sifter heads. This construction prevents the lifting of the flour by the radial arms at the ends of the sifting chamber. Said radial arms 31 are broad at the top or near the center of motion, to give them strength, and gradually taper toward the sifting bar 28. The upper end 32 of each radial arm is widened and at right angles to the half oval portion thereof and parallel to the axis of the rock shaft 29, and is adapted to extend through a slot in said rock shaft. This construction serves to increase the bearing and prevent rapid wearing between the parts and consequently lost motion. The area of the sifting surface of the sifting hopper is about one and one-half times that of the mixing basin.

The air chamber 27, as above stated, has perpendicular walls and is therefore of the same dimensions from the top to bottom so that the flour can fall direct from the sifter throughout the whole area of the mixing basin. Along the front side of this air chamber and near its upper edge extends the round bar or pipe 33, a short distance from the outside thereof, to serve as a handle for lifting up or pulling down the air chamber when desired. The air chamber 27 is hinged at 47, as shown in Fig. 12, to the rear side of the main framework 40 of the machine. The sifter hopper 25 is provided with the lugs 48 which rest on the top of the air chamber 27, and is secured in the usual way by spring catches not shown.

To the air chamber structure 27 is secured the counterweight 49, which need not be as heavy as the air chamber and sifter combined, but is preferably a little less in weight so that when the air chamber and sifter are down in the operative position, as shown in Fig. 1, they more than counterbalance the counterweight, the arm of which is then in the horizontal position. When, however, the air chamber and sifting hopper are raised to the position shown in Fig. 12 the bulk of their weight will be beyond their center of gravity and will therefore contribute to the force of the counterbalance 49 in maintaining them in the elevated position. Although, as above stated, the air chamber and sifting hopper are adapted to maintain the horizontal position against the force of the counterweight, for additional security a gravity catch 52 is provided, normally to maintain said chamber in the horizontal position. This gravity catch is shown in detail in Fig. 22. It is pivoted to the air chamber at 51 and is provided with the handle 50. The catch or hook end 52 is adapted to engage with the hook 53 secured to the stationary framework. The movement of catch 52 in the unlatching direction is limited by the stud 54, also secured to the air chamber 27. It will thus be seen that when the handle 50 is raised to cause the disengagement of latch 52 from hook 53, the moment latch 52 encounters lug 54 it serves to lift the air chamber into the elevated position. When the air chamber is brought back to the horizontal position the catch 52 slips over the inclined end of hook 53 and the handle 50 serves as a counterweight to lock the catch with the hook automatically.

The mixing basin 26 is hinged to the same shaft or hinge 47 as that which supports the air chamber and is adapted to drop in the position shown in Fig. 12 to discharge the dough into the tray 55. The mixing basin is held in the horizontal or normal position by any suitable catch 67 as shown in Figs. 1 and 5.

My preferred form of mixing mechanism is shown in Figs. 9 and 12, and comprises the spiral bars 37, and 38 supported by the spiders or bent arms 43 and the spiral bars 39 and 40 supported by the spiders or bent arms 44. These spiders 43 and 44 are supported at each end of the machine by trunnions 41 and 42 respectively, journaled in half boxes in the stationary framework of the machine. The spiders or arms 43 and 44 are so shaped relatively as to allow the end of one arm to approach close to the travel of the other arm without interfering with said arm. This permits a spiral bar carried by the arms 43 to approach near to a bar carried by the arms 44 so that the two bars will approach each other to the inside and pass each other and thus draw the dough, as they separate, one from the other, above the liquids and thereby aerate the same. The bent rods 37, 38, 39 and 40 are arranged spirally so that one tends to move the dough toward one end of the chamber and the other tends to move it in the other direction thus constantly changing the longitudinal position of different portions of dough in the basin so as to make an even mixture between said various parts or portions thereof. The spiders 43 and 44 are made to travel a short distance from the ends of the mixing chamber and air chamber to prevent their smearing the dough against the same. They are beveled upon the inside as shown at 45 and 46 Fig. 9, so as to push the dough away from the ends of the chambers and enable them to pass freely through the mass.

One trunnion 41 of mixing rods 37 and 38 is disengageably secured to the driving shaft 35 by the tenon 83 seated in the coöperating slot in crank member 36, as shown in Fig. 15. The thrust of the spiral rods 37 and 38 and consequently of trunnion 41 is in the direction of the arrow shown in Figs. 9, 14 and 15, that is, toward the journal box or bearing 95. A simple tenon 83 as shown in Fig. 15 is all that is necessary to maintain engagement between 41 and 35; the thrust being taken by the engagement of collars formed by the lower one side of crank member 36 against the journal box or bearing 95. The Arguto bushing or washer 93 shown in Fig. 14 is employed to dispense with the necessity of using a lubricant.

Trunnion 42 of the mixing rods 39 and 40 is disengageably connected with the driving shaft 68 by the T-tenon 84 seated in slot 85 as shown in Fig. 13. The spiral rods 39 and 40 running in reverse direction, tend to move said blades and consequently trunnion 42 in the direction of the arrow in Fig. 13, or opposite that indicated by the arrow in Fig. 9. This would tend to separate the connection between 42 and 68. This would also cause an undesirable thrust of the trunnion 42 against the far end of the mixing chamber. The T-shaped tenon and recess prevents such separation however, and the thrust or pull being between shoulder 96 and the stationary bearing or journal box 97, see Fig. 13. The Arguto bushing or washer 94 shown in Fig. 13 is employed to dispense with the necessity of using a lubricant.

Driving shaft 35 is driven by the pulley 69, and power is communicated from shaft 35 to shaft 68 through the gears 70. To shaft 35 is secured the double crank 36 operating the connecting rod 71, the crank 34 and rock shaft 29, to operate the sifter rod 28. In this way oscillating motion is imparted to the sifter bar from a double crank working directly on the main shaft at the driven end of the machine. By this means power is transmitted directly from the driven shaft to the sifter without being transmitted to the mixing shaft thereby avoiding complication and also the strain on the mixing shaft. The crank 36 is made double for the purpose of giving the reciprocating motion to the connecting rod and at the same time carrying the rotative motion beyond the same to the mixing shaft.

In place of the pulley 69 for driving shaft 35, an electric motor mechanism may be used with advantage. Such a mechanism is shown in Figs. 10 and 11 in which the motor 86 is mounted upon a bracket 90 projecting from the end of the framework of the machine. This motor drives the worm 87 which coöperates with the pinion 88 on the shaft 35. The various parts being inclosed and protected by the dustproof casing 91. The hand wheel 89 which is secured to the motor shaft 92 which projects beyond the worm and through the casing is provided for the manual manipulation of the mixing blades especially in the act of removing the dough therefrom. For convenience of taking care of this dough after it has been mixed in this machine and for a convenient place for it to rise and to further manipulate the same I provide a dough tray 55, whose length is a little greater than that of the basin of the machine and whose height is such as to readily pass under the machine when the basin is raised to its place. Said dough tray 55 is provided with casters 56, whereby it may be run over the floor or in under the machine with little labor and the tray is guided into its place by means of the guide bars 57 inside of the legs of the machine as clearly represented in Figs. 1, 5, 8 and 12. These bars 57 are flared open at the front edge to receive the tray and are bent at right angles at the rear end to form a stop for the tray when it has reached the required position to receive the dough from the basin. This dough tray is of such a width as to conveniently go under the machine without projecting beyond the floor lines thereof, and is of such capacity as to be capable of holding double the quantity of dough when raised as the machine is designed to make at one filling, so that two batches of dough may be made at one time and dropped in to the tray and the same raised, whereby the device is capable of producing double the quantity of dough that it is designed to mix at one time. This tray is supplied with legs 58 secured to rock shafts 59 at an angle greater than ninety degrees so that they flare out at the bottom or at their outer side and when they are folded up they clear the flare on the dough tray and are therefore allowed to fold up past the bottom as clearly shown in Fig. 1. When the dough tray is lifted up the catch 61 which holds the legs in the closed position is again released. As the legs drop into the open position they are locked automatically by the catches 60.

The construction and operation of the catch 60 is substantially as follows: This catch is pivoted to the tray 55 in connection with a keeper 73 rigidly secured to said tray. This member 73 is provided with shoulders 72 for limiting the movement of catch 60 in either direction. Catch 60 is so balanced as to normally hang by gravity substantially in the position shown in Fig. 19. When encountered by the lug 23 of the leg 58 it is forced into the position shown in Fig. 18, but when lug 23 is brought past the lower extension of catch 60 and into engagement with the fixed stop 74 secured to the bottom of the tray, the catch falls back to its normal position over the top of lug member 23 thereby securely locking the lug member 23 between said catch 60 and stop 74. It is obvious that one catch 60 will be sufficient for each pair of legs which, as above stated, are keyed together on the shaft 59. In order to release the leg from the locked position the handle part 75 of catch 60 is pulled upward which throws the latch out of engagement with lug member 23 and permits the folding of the leg. The proportions and positions of the lug member 23, the stop 74 and catch 60 are such with respect to the leg as to result in a set of legs forming a supporting base greater than that of the tray.

The catch 61 for securing the legs in the closed position is illustrated in detail in Figs. 20 and 21. This catch also has a gravity actuation and normally hangs in a substantially vertical position. It is pivoted at 76 to a bracket 63 projecting from the tray and it is provided by an arced counterweight 64 having the lug 62 at the upper extension thereof for engaging with the top of bracket 63 to limit the outward movement of said catch member 61. When the legs are raised into the inoperative position one of them encounters the inclined surface 77 of catch 61 to force the catch back out of the plane of travel of said leg 58. After it has passed said surface 77 of the projecting end of the catch, the catch slides back under the leg 58 into the position shown in Fig. 20.

The dough tray 55 in its position for manipulation of the dough is clearly shown both in front and side elevation in Figs. 16 and 17. For the convenient handling of this tray I supply handles 78 on the front and back thereof, whereby it may be lifted when desired to set it upon its legs. Drop handles 79 may be attached to the ends of the dough tray when desired, whereby the tray may be transported through narrow passageways by a person at either end. The cover 24 for the dough tray 55 is of peculiar construction as shown in Figs. 23 and 24. It consists of a board somewhat larger in dimensions than the top of the tray, and is provided upon one side with the ledge 80 around three edges thereof. This ledge 80 is adapted to project downwardly around the outside of the dough tray to serve as a guide in placing and maintaining the cover 24 upon the tray. It will be obvious that the ledge 80 will prevent movement of the cover upon the tray in three directions only. The inclined lugs 81 leaving a recess 82 to engage with the side of the dough tray serve to prevent movement in the other direction. It is to be observed that the recess 82 does not extend to the surface of the cover. This results in the cover being held a short distance above the top of the dough tray and thereby provides air space between the tray and the cover for the admission of the necessary air for the growth of the yeast plant. The cover 24 is made perfectly plain on its upper side so that when it is turned upside down on the dough tray it forms a very convenient dough board for the various manipulations after mixing the dough.

The operation of my device is as follows: The requisite amount of flour is placed in the sifter 25, and the requisite amount of water, milk, yeast, sugar, salt, and so forth, in the mixing basin 26 of the machine, and the machine closed, as represented in Fig. 1. Power being applied to the main driving shaft 35, the sifter bar 28 is reciprocated throughout the whole arc of the perforated bottom 30, and the flour is sifted rapidly into the mixing basin throughout its whole area. The sharp edges of the radial arms 31 of the sifter bar prevent the lodgment of flour upon same and being carried up and piled at the outer ends of the sifting chamber, as in previous machines. The spiral rods 37, 38, 39 and 40, rotating each within the circle struck by the other, thoroughly mix the flour and liquid in the basin 26 until it becomes viscous, when the dough is lifted up by the upraising rods and brought in contact with the rod of the opposite shaft, and the two passing each other the dough is drawn from one to the other in the air above the liquids, thus thoroughly aerating the same. The mixing rods being set spirally, move the dough one to one end of the mixing basin, and the other to the other, thus circulating the dough around in the basin and producing a thorough mixing. Owing to the very large area of the perforated bottom of the sifting chamber, and the large arc through which the sifting bar moves, the flour is sifted very rapidly into the basin when the operation first begins, but as the flour lowers in the sifting chamber the bar moves beyond the depth of the flour. As the flour gradually lowers in the sifting chamber, there is gradually less flour sifted into the basin as the operation proceeds. Hence, the operation is that when the liquid in the basin is purely liquid, the flour is received very rapidly therein, and as the mixture stiffens up with the flour there is gradually less and less flour sifted in until the finish, when the liquid has become thickened by the admixture of flour, and as it takes up the flour less readily less flour is admitted thereto, to compensate for same. By this operation I am enabled to produce a large quantity of dough, properly mixed, in the short space of one minute or less, and before the gluten has been dissolved by the moisture and the mass become viscous, when it refuses to take more flour and thoroughly saturate same, as has been the case in machines preceding this invention. After the mixing is completed the operation of the machine is stopped and the air chamber with its sifter raised up, and the basin with its freshly mixed dough therein dropped, and the machine run a turn or two, when the bulk of the dough is cleaned from the blades, and the balance scraped off and dropped through the frame into the dough tray, as before described. It will be observed that the dough tray is of such a height as to come far above the lower edge of the basin, and of such a length as to permit the basin to drop within the tray, thus enabling the dough to pass from the basin to the dough tray without being spilled over the side or edges. When all the dough is cleared from the mixing blades and from the basin, the basin is raised and the dough tray run out upon the floor on its casters. The tray may then be lifted up, the catch on the legs unhooked, whereupon the legs drop by gravity and fall into their position for supporting the tray at a convenient height for further operations upon the dough. The gravity catches, one for each pair of legs, drop into their place, thus locking the legs promptly in the proper position for supporting the tray with its load or double load of dough, as may be require. Now the dough tray is placed in the position desired for the operation of raising, or for the growth of the yeast plant, and covered with the cover, which is propped up by the inclined catch so as to admit the air for the growth of the yeast plant. When the bread has raised to double its bulk then it is ready to be cut down and put into the pans, as usual, and for this purpose we turn the cover upside down on the tray, and use it as a dough board, the ledges at the far edge and the two ends preventing the dough from being scattered therefrom.

What I claim is:—

1. In a dough mixing machine, the combination of a mixing vessel, a mixing device therein, and a flour sifter for delivering thereto, the delivery area of the sifter and the receiving area of the mixing vessel having such relation to each other and to the operating mechanism therein as to secure a delivery of all the flour from the sifter to the mixing vessel and a mixing of the same, in a space of time insufficient for the development of gluten, substantially as described.

2. In a dough mixing machine, the combination of a mixing vessel, a mixing device therein, a flour sifter for delivering thereto, the mixing device comprising oppositely directed, spirally arranged mixing rods rotating, the one across the path of travel of the other, each tending to move the dough in direction opposite to that of the other.

3. In a dough mixing machine, the combination of a mixing vessel, a mixing device therein, a flour sifter for delivering thereto, the mixing device comprising oppositely directed, spirally arranged mixing rods rotating in opposite directions, the one across the path of travel of the other, toward each other in the lower position, and away from each other in the upper position.

4. In a dough mixing machine, the combination of a sifting hopper, an air chamber, a mixing basin and a supporting frame therefor, the sifting hopper surmounting the air chamber, the air chamber hinged to the supporting frame and adapted to rotate upwardly therefrom, the mixing basin hinged to the supporting frame and adapted to rotate downwardly therefrom.

5. In a dough mixing machine, the combination of a sifting hopper, an air chamber, a mixing basin and a supporting frame therefor, the sifting hopper surmounting the air chamber and secured thereto by spring catches, the air chamber hinged to the supporting frame and adapted to rotate upwardly therefrom, the mixing basin hinged to the supporting frame and adapted to rotate downwardly therefrom, and a counterbalance connected with the air chamber.

6. In combination with a dough mixing machine, a dough tray, supporting legs therefor secured to shafts journaled on the dough tray, and gravity catches for securing the legs in the operative position.

7. In combination with a dough mixing machine, a dough tray, supporting legs therefor secured to shafts journaled on the dough tray, gravity catches for securing the legs in the operative position, and a gravity catch for securing the legs in the closed or inoperative position.

8. In combination with a dough mixing machine, a flour sifter comprising a sifter hopper, a sifter rod for sweeping the bottom of the hopper, and yoke bars for supporting the sifter rod, having segmental cross-section, with the flat sides thereof lying next to the adjacent hopper ends.

9. In combination with a dough mixing machine, a flour sifter comprising a sifter hopper, a rock shaft and a sifter rod provided with yoke bars having transverse flattened ends projecting through slots in the rock shaft.

10. In combination with a dough mixing machine, a dough tray and a dough board as a cover therefor having ledges around three edges of one side thereof, and notched lugs with inclined ends for maintaining the position of the board on the tray and so as to admit air thereto.

11. In combination with a dough mixing machine, a flour sifter comprising a hopper having a semicircular perforated bottom, the perforations extending substantially to the top of its longitudinal sides, a sifter rod adapted to sweep the perforated bottom and sides, a rock shaft for actuating the sifter rod, and journal bearings for the rock shaft located above the top margin of the hopper, as and for the purpose specified.

12. In a dough mixing machine, the combination of a flour sifter comprising a sifting hopper having a perforated bottom, a reciprocating sifting rod for sweeping said bottom and a slotted rock shaft for actuating the sifting rod, said rod provided with yokes passing through the slots in the rock shaft, said yokes provided with a semi-circular cross-section increasing in size from the sifter rod toward the rock shaft and terminating in transverse flattened extensions for engaging in the slots of the rock shaft.

13. In a dough mixing machine, the combination of a supporting frame, mixing shafts journaled therein, an air chamber hinged to the frame, a sifting hopper adjustably secured to the air chamber.

14. In a dough mixing machine, the combination of a supporting frame, mixing shafts journaled therein, an air chamber hinged to the frame, and a counterbalance connected with the air chamber.

15. In a dough mixing machine, the combination of a supporting frame, mixing shafts journaled therein, an air chamber hinged to the frame, a counterbalance connected with the air chamber, the parts being so proportioned and positioned relatively that when the air chamber is in the horizontal or operative position it will overbalance the counterbalance, but when in the raised or inoperative position said position will be maintained by the counterbalance.

16. In a dough mixing machine, the combination of a supporting frame, an air chamber pivotally secured thereto, a sifter surmounting the air chamber, and counterbalanced latching means for securing the air chamber to the framework in the operative position so as to resist the strain required to operate the sifter.

17. In a dough mixing machine, the combination of a supporting frame, an air chamber pivotally secured thereto, a sifter surmounting the air chamber, and counterbalanced latching means for securing the air chamber to the framework in the operative position, so as to resist the strain required to operate the sifter, said latching means comprising a bell-crank catch or hook with a handle serving as a counterbalance to maintain said hook in the closed position.

18. In a dough mixing machine, the combination of a supporting frame, an air chamber pivotally secured thereto, a sifter surmounting the air chamber, and counterbalanced latching means for securing the air chamber to the framework in the operative position so as to resist the strain required to operate the sifter, said latching means comprising a bell-crank catch or hook with a handle serving as a counterbalance to maintain said hook in the closed position, and a lug on the air chamber to encounter the catch hook, when moved into the disengaging position, to limit the further movement of said counterbalancing handle so that the same may serve as a handle for lifting the air chamber.

19. In combination with a dough mixing machine, a dough tray of sufficient capacity to hold double the quantity of dough that the machine is designed to produce at one filling, said tray provided with casters and adapted to be run beneath the dough mixing machine, and guide and stop means for securing its proper positioning thereunder.

20. In combination with a dough mixing machine, a tray for receiving the dough therefrom, said tray provided with casters, and adapted to run beneath the dough mixing machine and also provided with folding legs so that the tray may be run beneath the dough machine, when the legs are folded, and may stand at a proper height for manipulating the dough, when the legs are opened.

21. In combination with a dough mixing machine, a tray for receiving the dough therefrom, said tray provided with folding legs so that the tray may be run beneath the dough machine when the legs are folded, and may stand at a proper height for manipulating the dough when the legs are opened, and gravity actuated catches for securing the legs in the closed position.

22. In combination with a dough mixing machine, a tray for receiving the dough therefrom, said tray provided with folding legs, so that the tray may be run beneath the dough machine when the legs are folded, and may stand at a proper height for manipulating the dough, when the legs are opened, fixed stops and gravity actuated catches for securing and maintaining the legs in the open position.

23. In combination with a dough mixing machine, a tray for receiving the dough therefrom, adapted to run beneath the machine, legs keyed to shafts journaled on the sides of said tray adapted to move into the open or closed position, automatic means for maintaining said open position, comprising a lug extending substantially at right angles from the leg, a fixed stop on the dough tray to be encountered thereby, and a gravity catch adapted to be encountered and moved by said lug in moving the leg to the open position and then to fall back over the lug to lock the same between said latch and stop.

24. In combination with a dough mixing machine, a tray for receiving the dough therefrom, adapted to run beneath the machine, legs keyed to shafts journaled on the sides of said tray, adapted to move into the open or closed position, automatic means for maintaining said open position, comprising a lug extending substantially at right angles from the leg, a fixed stop on the dough tray to be encountered thereby, and a gravity catch adapted to be encountered and moved by said lug in moving the leg to the open position and then to fall back over the lug to lock the same between said latch and stop, and means for operating the latch to release the lug.

25. In combination with a dough mixing machine, a dough tray, a cover therefor comprising a board of greater dimension than the top of the tray, and surrounded on three sides by ledges for determining its position on the dough tray, and to serve as a guard for the falling of dough therefrom when used as a board and means for securing the admission of air into the tray when the board is in the covering position.

26. In combination with a dough mixing machine, a dough tray, a cover therefor, consisting of a board of greater dimensions than the top of the tray, provided with inclined recessed lugs to engage with one side of the tray to maintain the board in the required position, said recesses being so positioned and proportioned as to secure admission of air into the tray.

27. In a dough mixing machine, the combination of a dough tray, a cover therefor, consisting of a board of greater dimensions than that of the top of the tray, said board provided with ledges around three sides and with recessed lugs approximate the intermediate ledge for maintaining the board in desired position on the tray and securing an entrance of air thereto.

28. In a dough mixing machine, the combination of a mixing vessel, a mixing device therein, comprising a spirally arranged bar having supporting trunnions, a driving shaft, disengageable means for connecting a trunnion with the driving shaft, mounted and adapted to receive the thrust of the trunnion due to the spiral shape of the bar.

29. In a dough mixing machine, the combination of a mixing vessel, a mixing device therein, comprising a spirally arranged bar having supporting trunnions, a driving shaft, a T-tenon and recess as disengageable means for connecting the shaft and trunnion to counteract pull of the trunnion due to the movement of the spiral rod.

30. In a dough mixing machine, the combination of a mixing vessel, mixing mechanism therein, comprising a spiral shaft, means for rotating the same, and an Arguto bushing or washer forming a bearing for the thrust due to the spiral form of the rotating rod for the purpose specified.

CYRUS CHAMBERS, JR.

Witnesses:
MARY P. CHAMBERS,
LULU D. HAUBERT.